US009596291B1

(12) United States Patent
Basva

(10) Patent No.: US 9,596,291 B1
(45) Date of Patent: Mar. 14, 2017

(54) MIGRATION OF DATA STORAGE

(71) Applicant: International Business Machines Corporation, Armonk, NY (US)

(72) Inventor: Leena B. Basva, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/063,636

(22) Filed: Mar. 8, 2016

Related U.S. Application Data

(63) Continuation of application No. 14/953,503, filed on Nov. 30, 2015.

(51) Int. Cl.
*G06F 12/16* (2006.01)
*H04L 29/08* (2006.01)
*G06F 3/06* (2006.01)

(52) U.S. Cl.
CPC ............ *H04L 67/06* (2013.01); *G06F 3/0604* (2013.01); *G06F 3/067* (2013.01); *G06F 3/0643* (2013.01); *G06F 3/0647* (2013.01); *H04L 67/1095* (2013.01)

(58) Field of Classification Search
CPC ......... H04L 67/06; G06F 3/067; G06F 3/0647
USPC ...................................................... 711/162
See application file for complete search history.

(56) References Cited

U.S. PATENT DOCUMENTS

| 2004/0049513 A1* | 3/2004 | Yakir ............... G06F 17/30153 |
| 2011/0246429 A1 | 10/2011 | Prahlad et al. |
| 2014/0310493 A1* | 10/2014 | Pace ..................... G06F 3/0647 711/165 |

OTHER PUBLICATIONS

Arzensek, "Implementing the IBM Storwize V7000 Unified Disk System", IBM Redbooks, Apr. 2014, 372 pages.
Haustein, "IBM Storwize V7000 Unified: TSM HSM Overview and Implementation", IBM White Paper, Jul. 2012, Document Version 1.5, 22 pages.
"Dell High Performance Computing Tiered Storage Solution (HTSS)", Dell, Printed Aug. 19, 2015, 2 pages, <http://www.dell.com/learn/us/en/04/hpcc/storage-dell-htss>.
"EMC VNX with the Cloud Tiering Appliance: A Detailed Review", EMC, White Paper, Mar. 2015, 18 pages.
U.S. Appl. No. 14/953,503, filed Nov. 30, 2015; Entitled "Migration of Data Storage".
List of IBM Patents or Patent Applications Treated as Related; Dated Mar. 28, 2016; 2 pages.

* cited by examiner

*Primary Examiner* — Jae Yu
(74) *Attorney, Agent, or Firm* — Brian M. Restauro; Alexa L. Ashworth

(57) ABSTRACT

An operable mechanism implements a stub utility to facilitate the migration of stub files, where the stub utility is integrated with a data storage product and a data storage technique of an existing storage site containing the stub files. The stub utility identifies the stub files and uses virtualization to migrate the stub files to a new storage site without concomitantly recalling or accessing source files linked to the stub files.

1 Claim, 3 Drawing Sheets

MIGRATION OF DATA STORAGE

BACKGROUND

The present invention relates generally to the field of data migration, and more specifically to migration of stub files.

Hierarchical storage management (HSM) is a data storage technique, which automatically moves data between higher cost and lower cost storage media. Higher-speed storage devices (e.g., hard disk drive arrays) are more expensive per byte stored than slower-speed storage devices (e.g., optical discs and magnetic tape drives). In an ideal situation, data is stored and is available on high-speed devices at all times. However, this may be prohibitively expensive for many organizations. Instead, HSM systems store the bulk of the enterprise's data on slower-speed storage devices and then copy data to higher-speed disk drives when needed. In effect, HSM turns the fast disk drives into caches for the slower-speed mass storage devices. The HSM system monitors the way data is used and determines which data can safely be moved to slower-speed devices and which data should stay on the higher-speed devices.

A stub file is a computer file which appears to a user on a disk and is immediately available for use. The stub file is actually held either in part or entirely on a different storage medium. Upon accessing a stub file, the accessed file is intercepted by a device driver software, data is retrieved from the actual location of the stub file, the retrieved data is written to the stub file, and user access is allowed. Typically, users are unaware that the data within a stub file is stored on a different medium even if there is a slight delay when accessing such a file. Typically, the purpose of stub files is to move data from an expensive higher-speed storage device (e.g., a computer's hard drive) to a cheaper lower-speed storage device (e.g., a magnetic tape or an electro-optical disk) while not requiring the knowledge of using specialized storage software to retrieve the data. Stub files allow a system manager to enforce the use of cheaper storage when users would prefer to store files on the highest availability and higher cost devices. Stubbing is a feature of some commercial file backups, archiving packages, and operating systems.

SUMMARY

According to an aspect of the present invention, there is a method, computer program product and/or system that performs the following operations (not necessarily in the following order): (i) receiving, by one or more processors at a first storage site, a request to migrate a set of file(s) from the first storage site to a second storage site; (ii) identifying, by one or more processors at the first storage site, a stub file within the set of file(s) to be migrated, wherein the stub file is linked to a source file located at a storage site that is not the first storage site or the second storage site; (iii) creating, by one or more processors at the first storage site, a virtualized environment containing the identified stub file; and (iv) migrating, by one or more processors at the first storage site, the virtualized environment from the first storage site to the second storage site, wherein upon migration, the source file is accessible at the second storage site via the stub file contained in the migrated virtualized environment.

DETAILED DESCRIPTION

Figure 1:
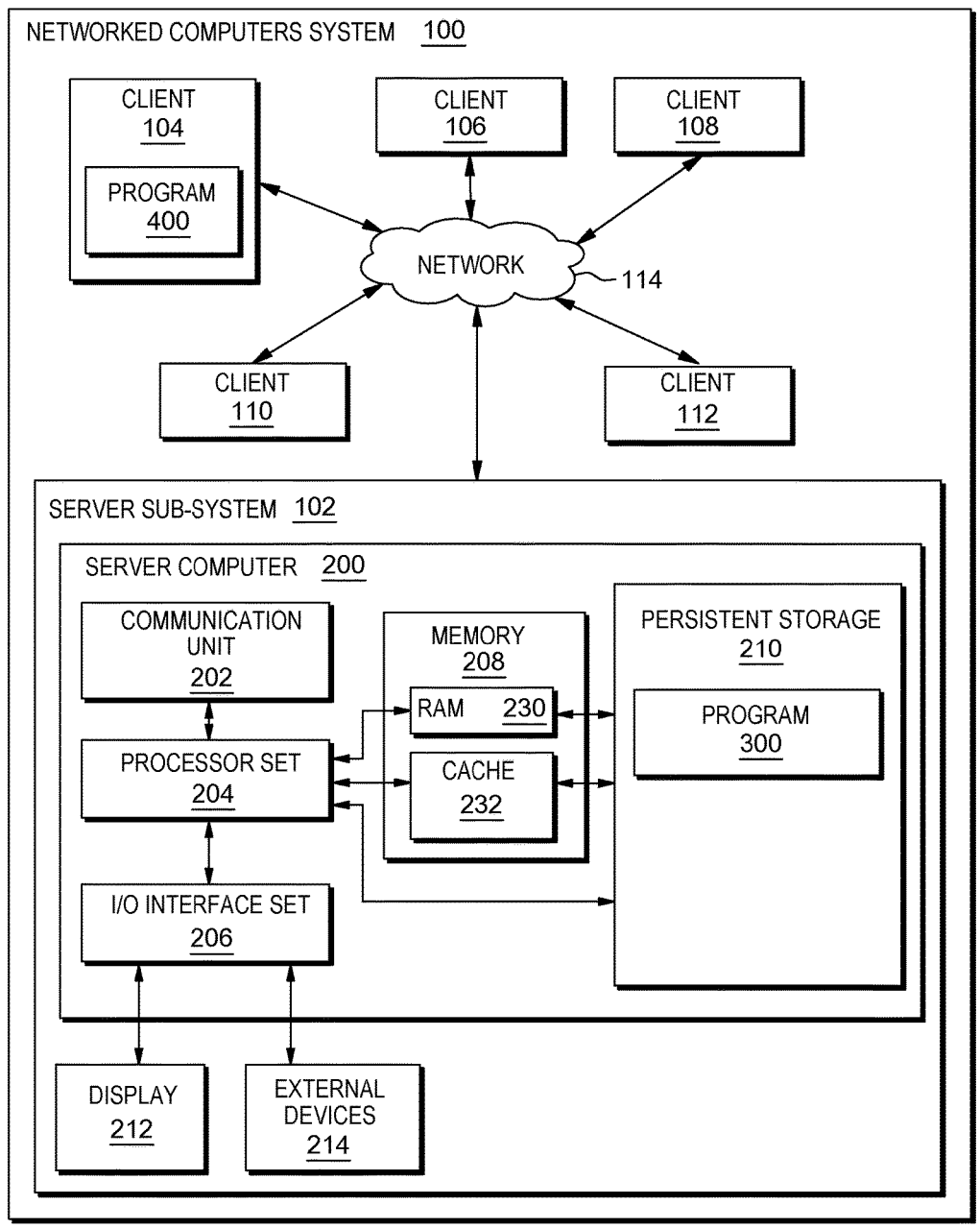
FIG. 1 is a block diagram view of a first embodiment of a system according to the present invention.

In typical hierarchical storage management (HSM) scenarios, data files are used, stored on disk drives, and eventually migrated to storage tape (or other less expensive storage) when they are not used for a certain period of time, leaving stub files on the original disk in order to provide access to the migrated files. When a user attempts to access a stub file, the migrated file (also referred to as the "source file") is then migrated back to disk storage. Embodiments of the present invention use virtualization to allow for the transfer of stub files between locations without invoking or triggering call back of source files (for example, from storage tape). In this way, large amounts of stub files may be migrated quickly and efficiently without requiring the typical data recall associated with accessing a stub file. This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; program 300; and program 400.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
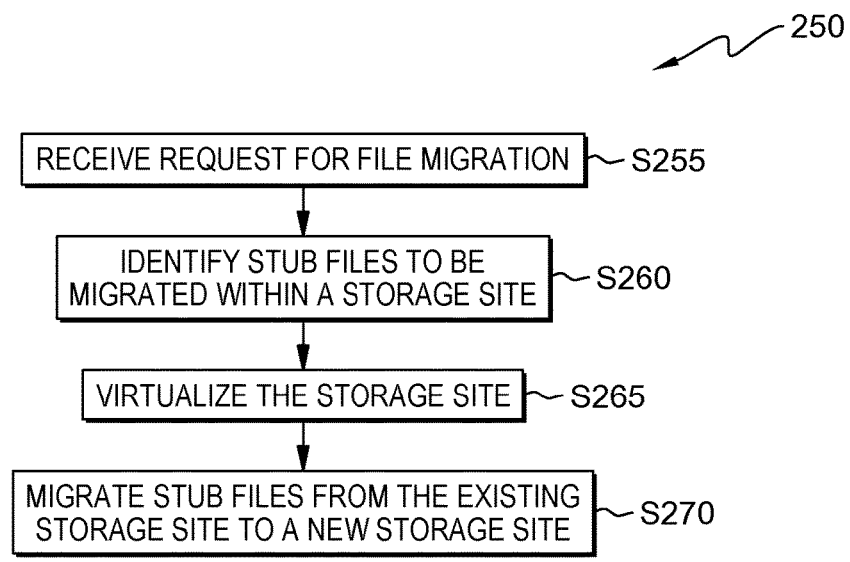
FIG. 2 is a flowchart showing a first embodiment method performed, at least in part, by the first embodiment system.
Figure 3:
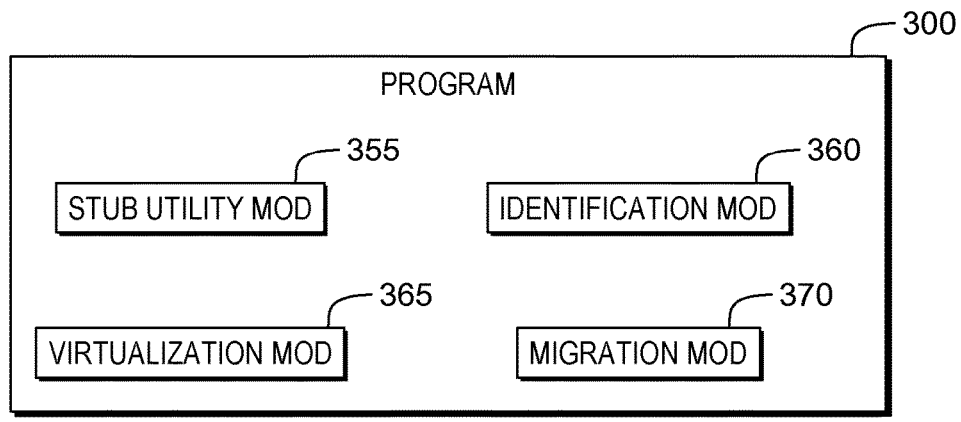
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

In this embodiment, a generic stub utility (stub utility MOD 355—see FIG. 3) is introduced into a data storage product—specifically, an HSM environment. Generally speaking, stub utility MOD 355 uses a generic stub template to create stub files (also sometimes also referred to as "stubs"), and the techniques and methods facilitated by stub utility MOD 355 to create stubs are similar to those of known stub utilities. For example, a generic new stub file Y can be created using information from a generic stub file X. After a source file has undergone a migration, the content of the source file is no longer on the site from which the source file migrated from. Thus, stub files are implemented in order to provide transparent access (i.e., the capability of accessing a remote file as if the remote file is local) to the content of the source file.

In a typical HSM scenario, data files which are frequently used are stored on disk drives, but are eventually migrated to tape if they are not used for a certain period of time, leaving the stubs behind. In the present embodiment, as will be discussed further below, virtualization is used to migrate stubs from the primary storage (for example, SUN or EMC) to new storage (for example, V7000U) without recalling the source files (which can be located in secondary storage such as tape or other low tier storage). It should be noted that in this example embodiment, the source file has already been migrated by the HSM either to the tape or any other disk such as SATA, prior to virtualization and storage migration. Thus, it is only the stub files that are being migrated. Apart from the stub files, the virtualization and storage migration features of system 102 can still migrate other source files (non-stub files) from the primary storage.

The data storage product may provide source file storage via Network Attached Storage (NAS) protocols and block (i.e., data volumes) storage via block storage protocols such as Fibre Channel and iSCSI. The data storage product can be internally configured to automatically move a file between different tiers of storage. Source files are moved between disk-tiers and are managed by the data storage product. Furthermore, source files stored according to a data storage technique such as HSM may be moved from a repository within an existing storage site of the data storage product to a different site (e.g. external server) while maintaining transparent access to the source file. Transparent access provides an application with access to remote files as if the remote file is local.

Processing begins with operation S255, wherein stub utility mod 355 receives a request for file migration. Stated another way, in this operation, stub utility mod 355 receives a request to migrate one or more files from a first location (for example, server sub-system 102, also referred to as the "existing storage site") to a second location (for example, client sub-system 104, also referred to as the "new storage site"). In this embodiment, one or more of the files identified in the request are not actually locally stored, and are instead represented by local stub files that link to remote source files. However, the distinction between stub files and source files may not be readily apparent to a user of networked computers system 100.

Processing proceeds to operation S260, where identification mod 360 identifies stub files within the storage site. Identification mod 360 may identify stub files using any of a wide variety of methods known (or yet to be known) in the art. For example, in the present embodiment (and/or embodiments that utilize an Active Engine Cloud or its functional equivalent), stub utility mod 355 identifies stub files based on attributes such as an offline bit or file size. (Note: the term(s) "Active Engine Cloud" may be subject to trademark rights in various jurisdictions throughout the world and are used here only in reference to the products or services properly denominated by the marks to the extent that such trademark rights may exist.) In other embodiments, identification mod 360 may identify a reparse point associated with a sparse file representation of the migrated source file. Further, in some embodiments, intelligence analytics are added into the data storage product hardware which have the capability to identify any generic stub files created by stub utility mod 355.

Processing proceeds to operation S265, where virtualization MOD 365 virtualizes the storage site (i.e., the existing storage site) that includes the identified one or more stub files. Upon virtualization, the stub files reside in a virtualized storage site which can interact with the generic stub utility. The stub utility is integrated with the data storage product while working in concert with the virtualized storage site, which is compatible with a network-attached storage (NAS) environment without any dependency upon the nuances (i.e., inherent characteristics) of the existing storage site (i.e., source of the stub file) or the new storage site (i.e., target of the stub file). Upon virtualization, the stub files are ready to be migrated from the existing storage site (i.e., a site of a first format) to the new storage site (i.e., a site of a second format), which, as discussed in further detail below, can be performed without recalling the sources files (which are located in secondary storage such as tape or another low tier).

Processing proceeds to operation S270, where migration mod 370 migrates stub files from the existing site (for example, server sub-system 102) to a new storage site (for example, client sub-system 104). In this embodiment, the migration is carried out by migration mod 370 via the virtualized existing site which houses the stub file to be migrated. The virtualized existing site serves as an intermediary to facilitate the migration of a stub file while retaining inherent attributes of the stub file and retaining the attributes (e.g., tenant policies) of other entities of the existing storage site and the new storage site. Upon migration, the new storage site is able to access the virtualized existing site to complete the migration of the stub file by creating a duplicate stub file which inherits properties from the original stub file. The inherited properties may be any of a wide variety of known (or yet to be known) properties, including properties applicable to generic stub files created by any HSM. Migration mod 370 facilitates the migration of stubs from the existing storage site to the new storage site while continuing to use the new storage site to store the source files. Thus, these generic stubs files are not bound to any particular data storage technique or to any particular feature which is associated with archive or backup software.

Figure 4:
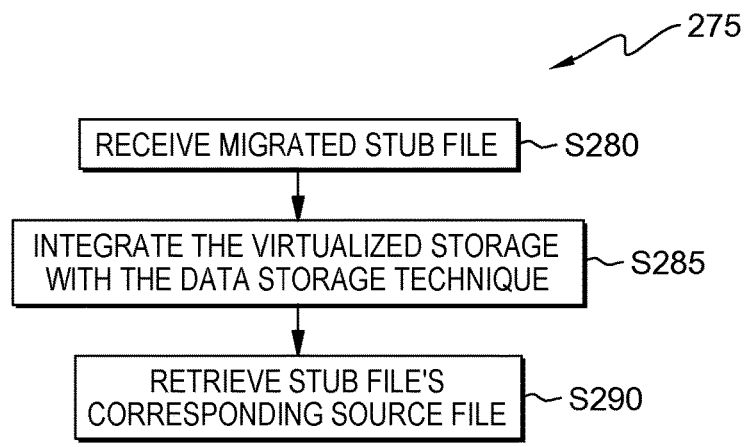
FIG. 4 is a flowchart showing a second embodiment method performed, at least in part, by the first embodiment system.
Figure 5:
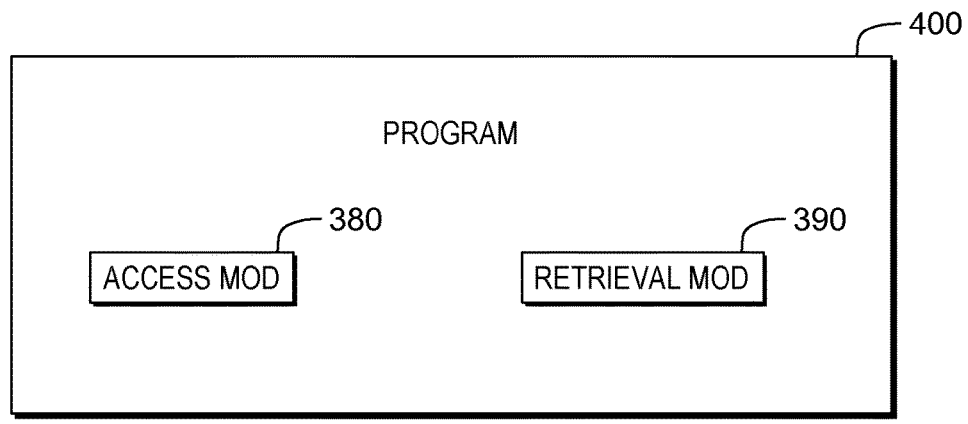
FIG. 5 is a block diagram showing a machine logic (for example, software) portion of the first embodiment system.

FIG. 4 shows flowchart 275 depicting a method for receiving a migrated stub file according to the present invention. FIG. 5 shows program 400, located on the new storage site (i.e. client sub-system 104), for performing at least some of the method operations of flowchart 350. This method and associated software will now be discussed, over the course of the following paragraphs, with reference to FIG. 4 (for the method operation blocks) and FIG. 5 (for the software blocks).

Processing begins with operation S280, where access mod 380 receives the migrated stub file. The migrated stub file is located in a virtualized environment which permits access mod 380 to receive the migrated stub file. Without virtualization, the stub file would be undetectable by the new storage site, which employs a different data storage technique than the existing storage site where the stub file was created. However, because the stub file is stored in a virtualized environment that retains all of the stub file's original properties, it is able to be accessed by the new storage site, as will be discussed in further detail below.

Processing proceeds to operation S285, where access mod 380 integrates the virtualized storage containing the stub file with the data storage technique of the new storage site. (Access mod 380 controls access to stub files and source files.) Many known (or yet to be known) integration methods may be used by access mod 280 during this operation. For example, some embodiments may employ a tag value to distinguish a particular stub file as being associated with replication data that has been migrated, archived, de-duped or otherwise moved to a different storage site. The tag value can be applied on generic stub files created by a data storage technique (e.g., HSM) as opposed to a stub file replicated from the existing storage site (i.e., the source of the stub file). For example, the tag value can comprise an identifier that is compared with a list of identifiers in a migration table or index to determine if the stub file is a de-duplicated stub file or a replicated stub file. Data storage products are frequently incapable of identifying generic stub files created using other data storage techniques. By integrating the data storage product of the new storage site with the data storage technique of the existing storage site, the details of the stub-files are captured. The integration permits the data storage product of the new storage site to house a generic stub utility (within a virtualized environment) which is compatible with the data storage technique of the existing storage site and can be used for future migration operations.

Processing proceeds to operation 5290, where retrieval mod 390, responsive to receiving a request for a stub file, retrieves the stub file's corresponding source file. Because the virtualized environment of the stub file has been integrated with the storage product of the new storage site, when the stub-file is accessed by a user of the new storage site, the source file is recalled from the new storage site. The usage of the migrated stub files to retrieve source files does not alter the data storage technique (e.g., HSM) policies as the data storage technique policies remain intact within the virtualized environment. In some embodiments, such as the HSM solution of the present example embodiment, the data storage technique policies will remain in the same folder and files no matter what the underlying storage is. The migrated stub file backs up the source file and the source file is transparently restored.

III. FURTHER COMMENTS AND/OR EMBODIMENTS

Existing solutions and the associated drawbacks include: (i) existing HSM integration systems are not capable of identifying the generic stub files created by any HSM solution; (ii) certain existing systems can only archive data from certain other systems and cannot move or archive data and stub files from other storages sources; (iii) existing systems do not support virtualization for migration of data and are not capable of supporting the moving of stub files without recalling the data in files; (iv) certain existing systems are not capable of virtualizing third party storages to ease the data migration process and are not capable of moving stub files without recall of all the major vendor storages; and/or (v) certain existing systems cannot support certain stub files.

In one example, a customer has the need to migrate only the Tier 1 data (such as mission-critical, recently accessed, or top secret files) to a different storage and keep Tier 3 data such as event-driven, rarely used, or unclassified files on tapes with stubs still on primary storage (and continue the existing HSM policies). Embodiments of the present disclosure are directed towards a mechanism such as a generic stub-aware or stub scanner utility to be introduced in a data storage product which identifies the stub files and utilize a "move functionality" to migrate the stub files from an existing storage to new storage such that the source files are not accessed and a recall is not triggered (provided the external storage is virtualized and is accessible by the data storage product of the new storage site). A file management functionality typically has the ability to identify the stub files or the sparse file representation of a migrated file with a reparse point attached to its attributes (e.g., an offline bit and size). A data storage product of the present disclosure can be implemented in any 2-tier or 3-tier HSM environment or cloud computing infrastructure. Virtualization eases migration of stub files and complements a generic stub-aware/stub scanner. The ability to integrate with any HSM server and to capture the stub file details allows a data storage product to have a generic stub aware or stub scanner utility. It is not required for both the source and the target to be the same HSM software or integrated hardware for the mechanism of the generic stub-aware or stub scanner utility to be operable. Stub files are migrated without recalling the files and thus reduce the duration of the migration. Once the stub files are migrated, any existing HSM policies remain intact, and the HSM solution still resides in the same folder and files despite the location of the underlying storage.

Some embodiments of the present invention may include one, or more, of the following features, characteristics and/or advantages: (i) a mechanism of data migration facilitated by a generic stub aware—stub scanner utility; (ii) a generic stub aware—stub scanner utility to identify stub files; (iii) virtualizing existing storage to facilitate the migration of stub files; (iv) a moving functionality to migrate stub files from an existing storage site to a new storage site while concomitantly not accessing source files and not triggering a recall of source files; (v) makes business application development more efficient; (vi) a local Active Cloud Engine—in combination with the HSM capability, integrates with the Data Management API (DM API) and the GPFS file system; (vii) intercepting source file access to enable the capability of identifying stub files by its attributes (e.g., an offline bit on the file set when the stub was created during archival) of the stub file and triggering an action called "move stub file" without recalling the source file; and/or (viii) upon moving stub files, the HSM policies (if any) remain intact and an HSM solution still remains in the same folder and file despite any underlying storage consideration.

In any HSM solution, when a source file is migrated, the stub file retains attributes of the source file by indicating a location of the file data in the secondary storage site and indicting that the stub file is to be retained for the retention period.

A GPFS file system can provide a fast and a scalable scan engine which can scan through all files or subdirectories quickly and is used for multiple purposes. The Active Cloud Engine utilizes a GPFS scan and a policy engine.

In some embodiments, a scan and policy engine is required to read all of the metadata which belongs to the migrated file from the stub file which is left behind after migration. In order to read the stub files created by (if any) HSM clients, interception of source file access is required. The interception of source file access occurs by integrating with a HSM client via Data Management API (DM API) and a file system filter driver. Once the policy engine identifies stub files based on its attributes (e.g., reparse point, sparse and offline bit), the policy engine moves the stub file instead of triggering a recall of the data from the new storage site. In this instance, the file system filter driver, the recall service, and the function of HSM client work in conjunction with each other.

In some embodiments, a policy contains rules which describe the selection criteria of source files and the action to be performed for the selected source files. Selection criteria of files are typically based on the source file attributes, such as the file and path name, the file size, the file time stamps and the ownership of files. The action to be performed can include: initial file placement, file migration, and file deletion.

In some embodiments, the migration process is requested if only attributes of a source file have changed and not the content of the source file. This is because file attributes are stored with the file content.

In some embodiments, a data storage technique has the capability of performing a migration or a pre-migration. During pre-migration, copies are made of a source file. During migration, the copies of a source file are moved to a new storage site (i.e., a secondary site). The purpose of pre-migration is to keep a copy of the source file on an existing storage site (i.e., a primary site) in order to permit faster access while also having a copy in the new storage site. The disadvantage of pre-migration is that it does not reduce the occupied storage capacity on the existing storage site. In order to reduce the occupied storage capacity on the existing source site, a migration of a source file or a stub file has to be performed.

In some embodiments, the interception of file access is executed within the data storage product with data storage technique or a framework via the integration of the Data Management API (DM API) and the GPFS file system. In the case of a TSM HSM system, the TSM HSM capability must be broadened to include or support a common HSM framework (i.e., a "HSM agent") which can communicate with any HSM server (as a CIMOM agent does). The local Active Cloud engine (which can be an integral part of the data storage product) in combination with the capability of a data storage technique, must be used to perform the migration of stub file without recalling from the external storage site to internal storage site after performing the necessary virtualization steps. Once the stub files are moved, the data storage technique policies (if any) remain intact. For example, for an HSM solution, the policies will still be in the same folder and files regardless of what the nature of underlying storage is.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

And/or: inclusive or; for example, A, B "and/or" C means that at least one of A or B or C is true and applicable.

Including/include/includes: unless otherwise explicitly noted, means "including but not necessarily limited to."

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:
   receiving, by one or more processors at a first storage site, a request to migrate a set of file(s) from the first storage site of a first format to a second storage site of a second format, within a hierarchical tiered storage system;
   identifying, by one or more processors at the first storage site, a stub file within the set of file(s) to be migrated, wherein the stub file is linked to a source file located at a storage site that is not the first storage site or the second storage site and the source file is accessible at the first storage site via the stub file;
   creating, by one or more processors at the first storage site, a virtualized environment containing the identified stub file and all content associated with the first storage site, wherein stub file identification is based on at least one of an offline bit attribute and a file size attribute, a reparse point with a sparse file representation, and a determination of generic-type stub files;
   responsive to determining the second storage site is incompatible with the first storage site, capturing, by one or more processors, content associated with the identified stub file;
   integrating, by one or more processors, both the first storage site and the second storage site with the virtualized environment using the identified stub file;
   responsive to integrating the first storage site and the second storage site with the virtualized environment, migrating, by one or more processors, the integrated virtualized environment from the first storage site to the second storage site, wherein the integrated virtualized environment includes the identified stub file and all content associated with the first storage site;
   responsive to migrating the integrated virtualized environment, enabling, by one or more processors, access to the source file at the second storage site via the stub file contained in the migrated virtualized environment without accessing the source file linked to the stub file contained in the migrated virtualized environment; and
   responsive to migrating the integrated virtualized environment, integrating, by one or more processors at the first storage site, the migrated, virtualized environment containing the identified stub file into the second storage site such that content of the source file may be accessed via the identified stub file without altering the second format of the second storage site.

* * * * *